United States Patent
Sachtleben

(10) Patent No.: US 10,925,429 B2
(45) Date of Patent: Feb. 23, 2021

(54) COFFEE MACHINE AND METHOD FOR OPERATING A COFFEE MACHINE

(71) Applicant: MELITTA EUROPA GMBH & CO. KG, Minden (DE)

(72) Inventor: Andreas Sachtleben, Minden (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 231 days.

(21) Appl. No.: 15/778,218

(22) PCT Filed: Oct. 11, 2016

(86) PCT No.: PCT/EP2016/074319
§ 371 (c)(1),
(2) Date: May 22, 2018

(87) PCT Pub. No.: WO2017/097461
PCT Pub. Date: Jun. 15, 2017

(65) Prior Publication Data
US 2018/0344071 A1    Dec. 6, 2018

(30) Foreign Application Priority Data
Dec. 11, 2015  (DE) ..................... 10 2015 121 634.5

(51) Int. Cl.
*A47J 31/06* (2006.01)
*A47J 31/44* (2006.01)
(Continued)

(52) U.S. Cl.
CPC .......... *A47J 31/0652* (2013.01); *A47J 31/002* (2013.01); *A47J 31/0631* (2013.01); *A47J 31/4478* (2013.01); *A47J 31/468* (2018.08)

(58) Field of Classification Search
CPC ...... A47J 31/4475–4478; A47J 31/0631; A47J 31/0652; A47J 31/02; A47J 31/057
See application file for complete search history.

(56) References Cited

U.S. PATENT DOCUMENTS

| 5,477,775 A | * | 12/1995 | Delhom | ............... | A47J 31/4478 |
| | | | | | 99/299 |
| 6,779,437 B2 | * | 8/2004 | Sachtleben | ......... | A47J 31/4478 |
| | | | | | 99/305 |
| 8,495,950 B2 | | 7/2013 | Fedele et al. | | |

FOREIGN PATENT DOCUMENTS

| DE | 69433248 T2 | 3/1994 |
| DE | 19727888 C1 | 7/1997 |

(Continued)

OTHER PUBLICATIONS

International Search Report dated Jan. 3, 2017 in PCT/EP16/74319 (5 pages, including English translation).

(Continued)

*Primary Examiner* — Matthew P Travers
(74) *Attorney, Agent, or Firm* — FisherBroyles, LLP; Robert Kinberg

(57) ABSTRACT

A coffee machine includes a device for supplying hot water to an outlet device. The outlet device is adapted for being arranged above a filter vessel into which a filter paper insert with ground coffee is insertable and for receiving the hot water from the hot water supply. The outlet device has a central outlet opening over a middle region of the filter-paper insert when filled with ground coffee and a plurality of outer outlet openings arranged above a middle region of the side walls of the filled filter-paper insert. A controllable selector switch controls a rate of hot water through individual outlet openings of the outlet device. The controllable selector switch has at least three switching positions for adjusting coffee strength. In all switching positions of the controllable selector switch the hot water is at least partially supplied via the outer outlet openings over the filled filter-paper insert.

10 Claims, 10 Drawing Sheets

(51) Int. Cl.
*A47J 31/46* (2006.01)
*A47J 31/00* (2006.01)

(56) References Cited

FOREIGN PATENT DOCUMENTS

| | | |
|---|---|---|
| DE | 29711421 U1 | 9/1997 |
| DE | 202014104028 U1 | 9/2014 |
| EP | 0616785 A1 | 9/1994 |
| EP | 1287772 B1 | 8/2002 |
| JP | S56166818 A | 12/1981 |
| JP | 2003093236 A | 4/2003 |
| JP | 2012100821 A | 5/2012 |

OTHER PUBLICATIONS

German Search Report issued in 10 2015 121 634.5 (1 page).
Japanese Office Action in corresponding Japanese Patent Application No. 2018-529958, dated May 27, 2020, 8 pages with English Google Translation.

* cited by examiner

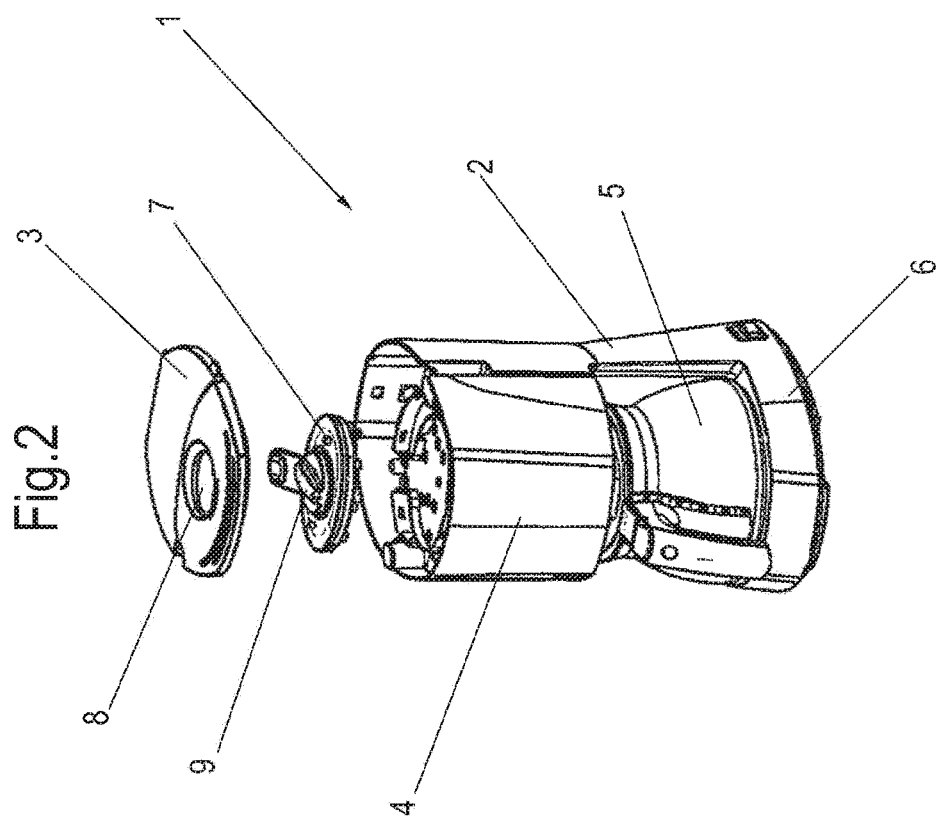
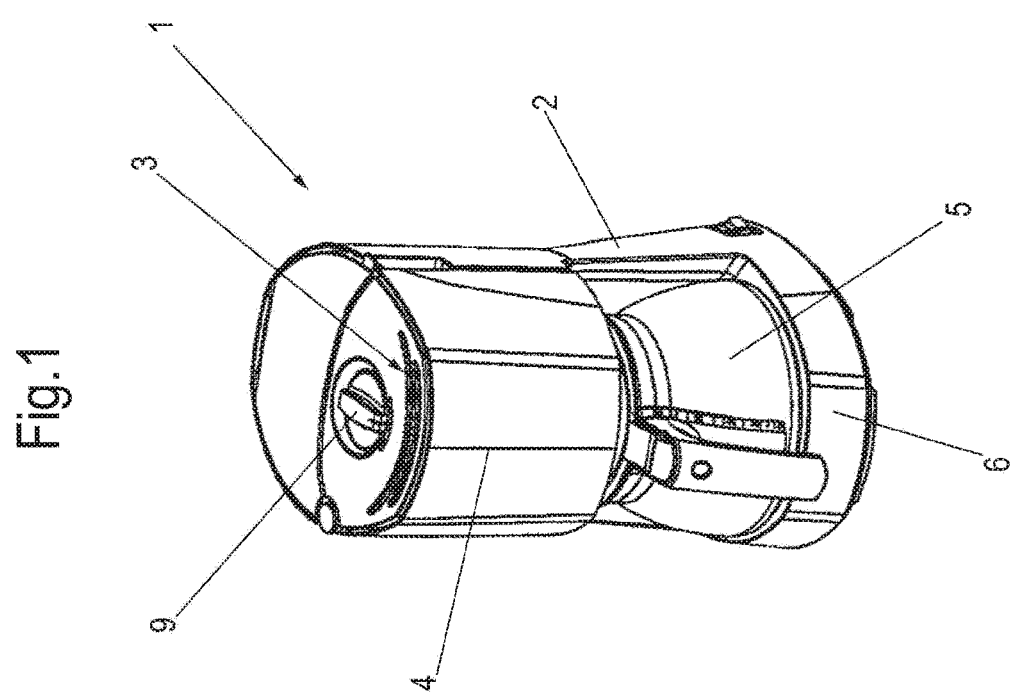

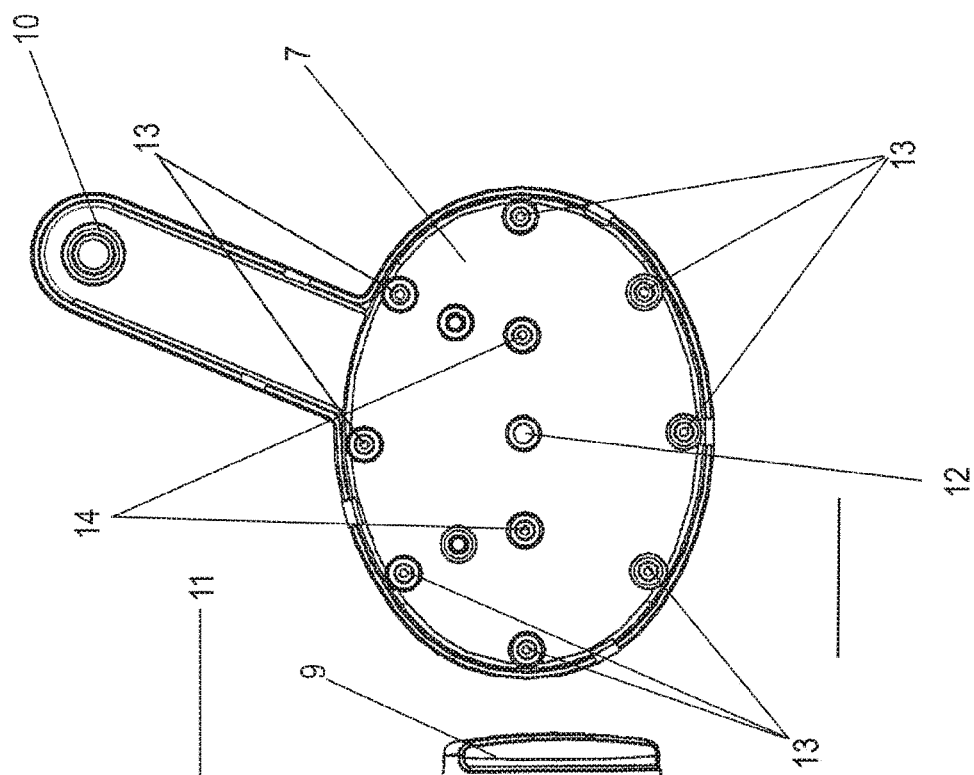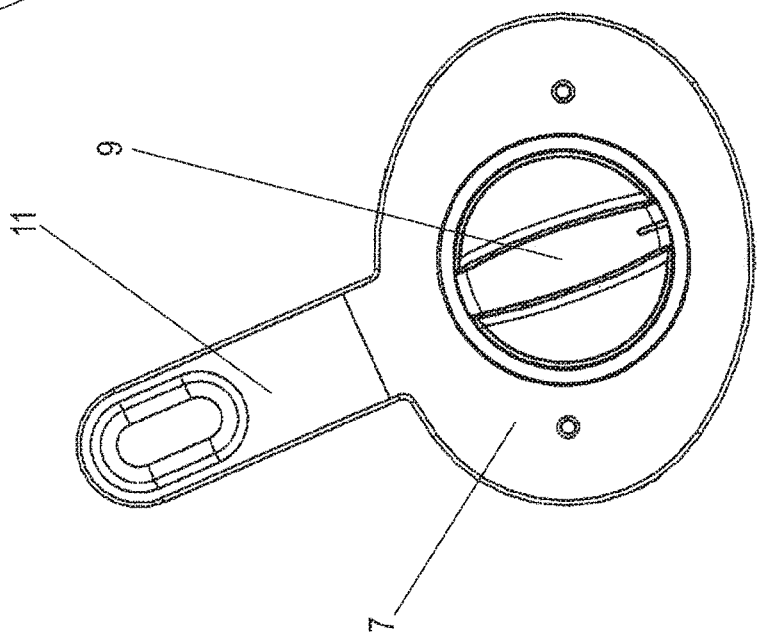

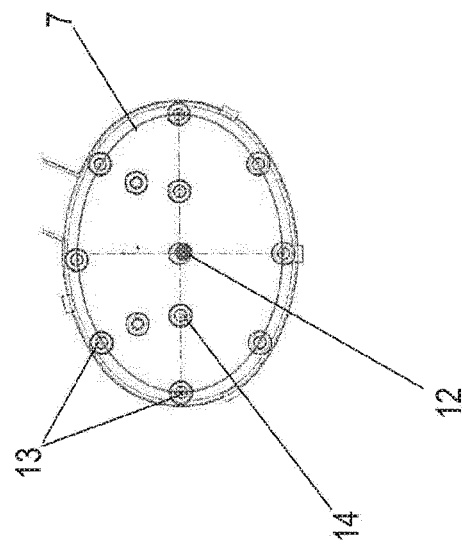
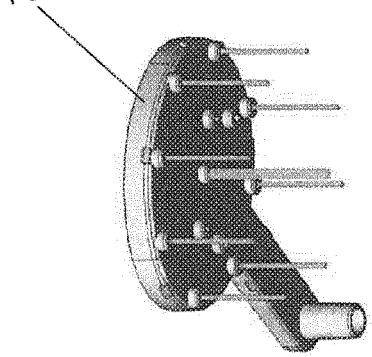
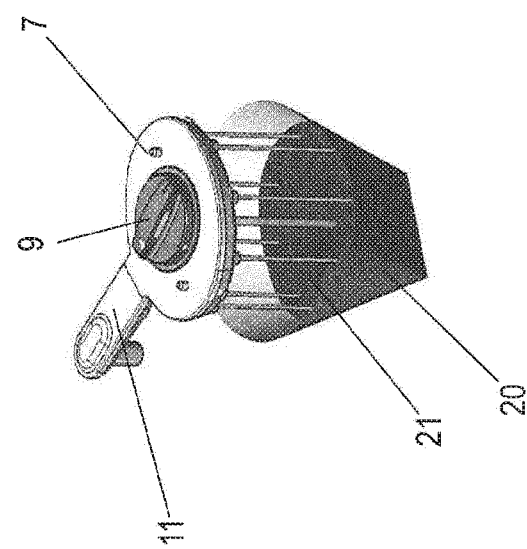

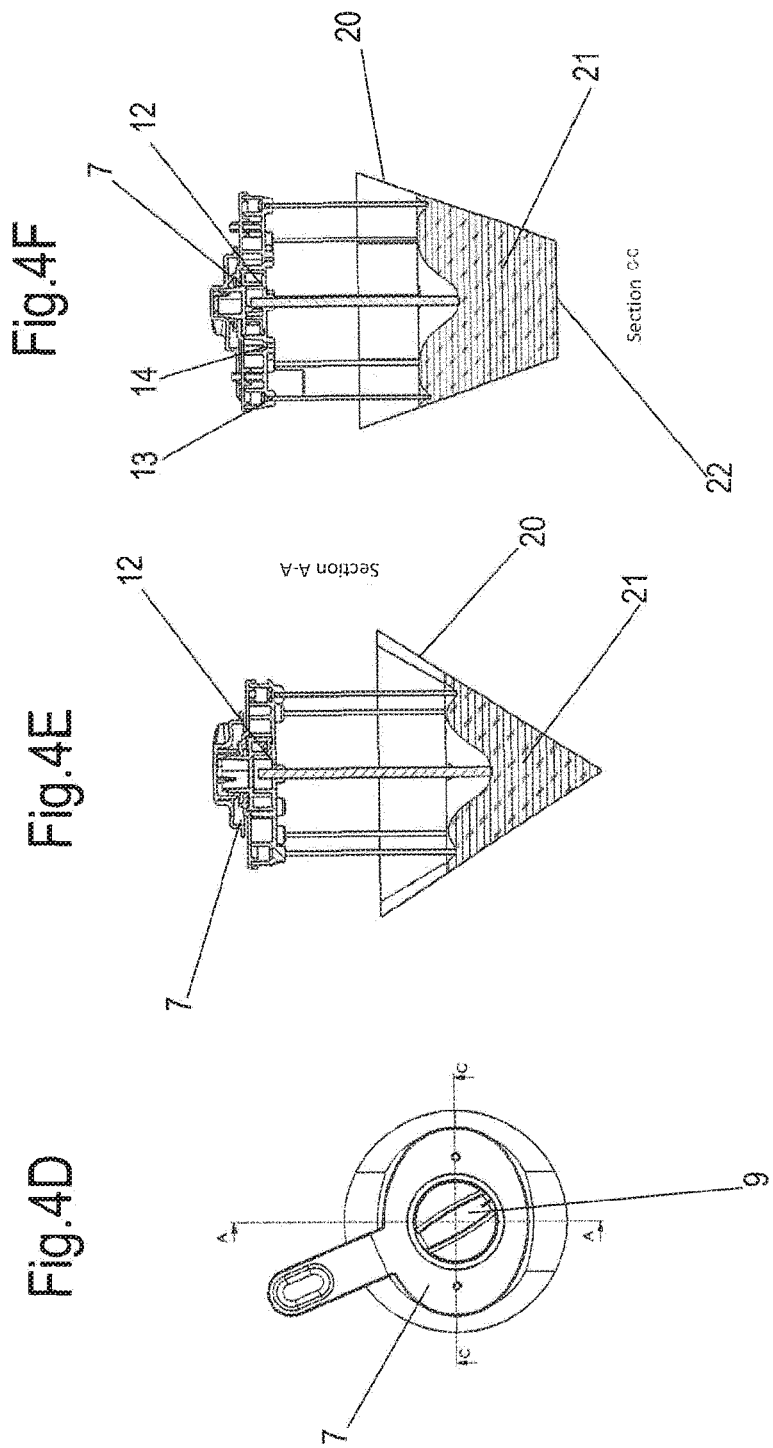

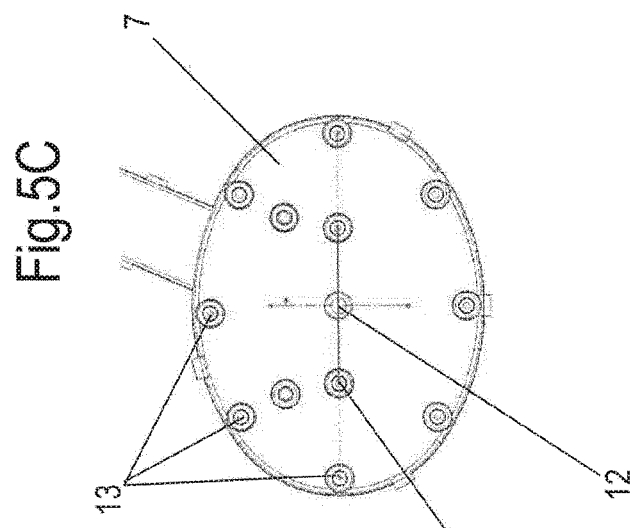
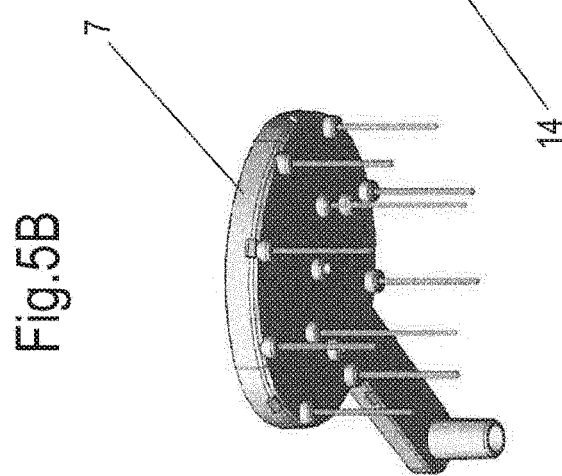
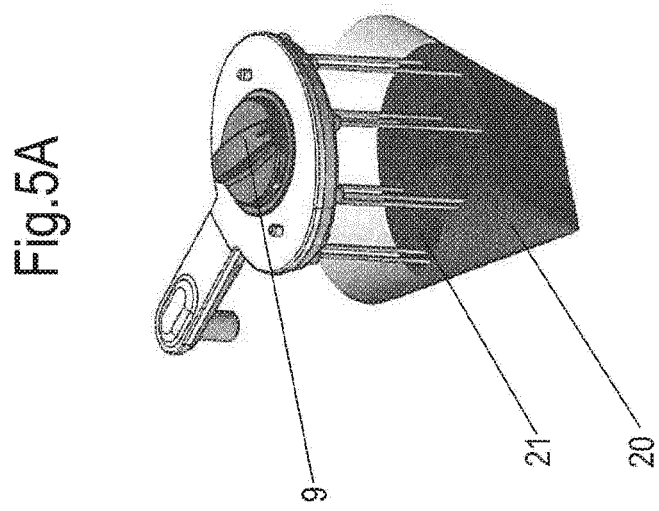

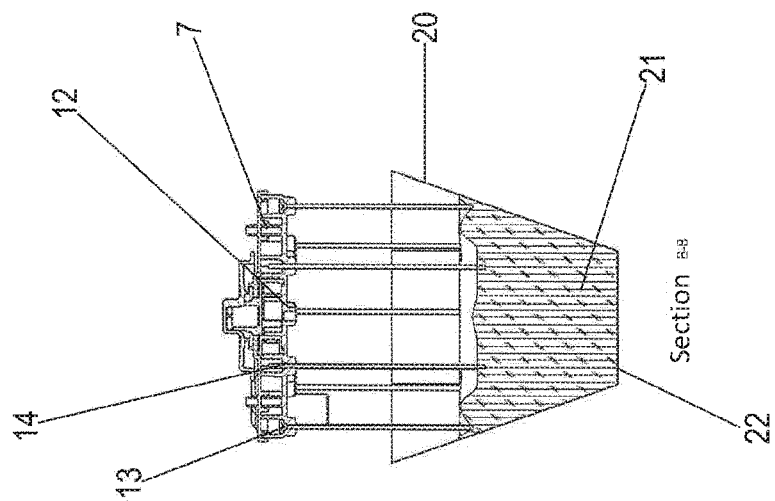
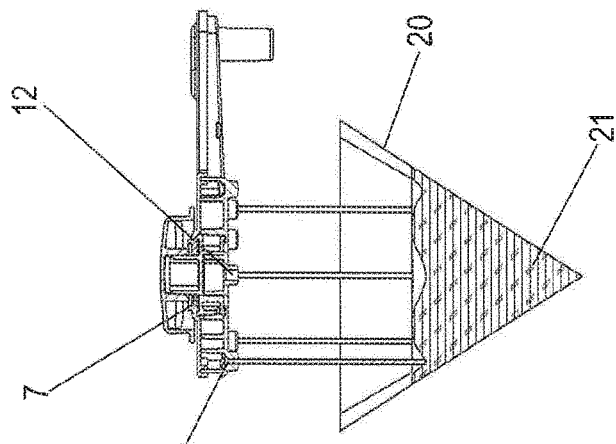
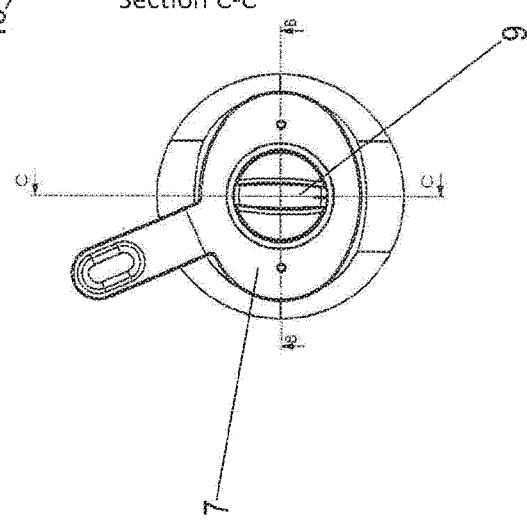

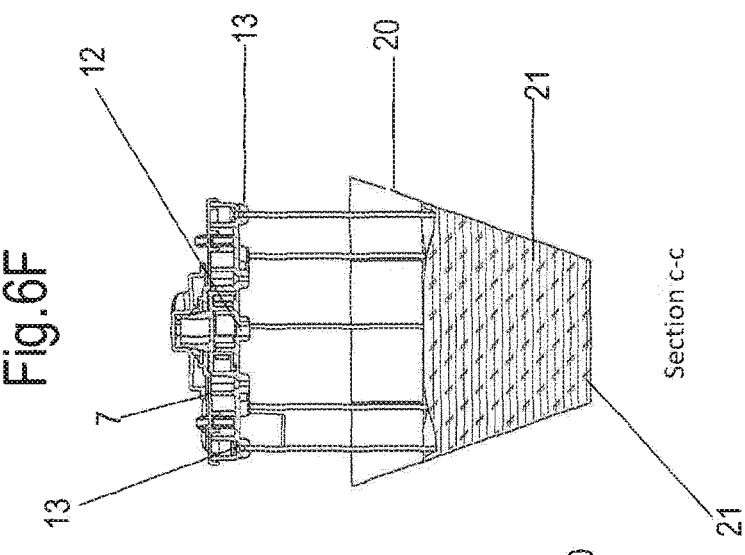
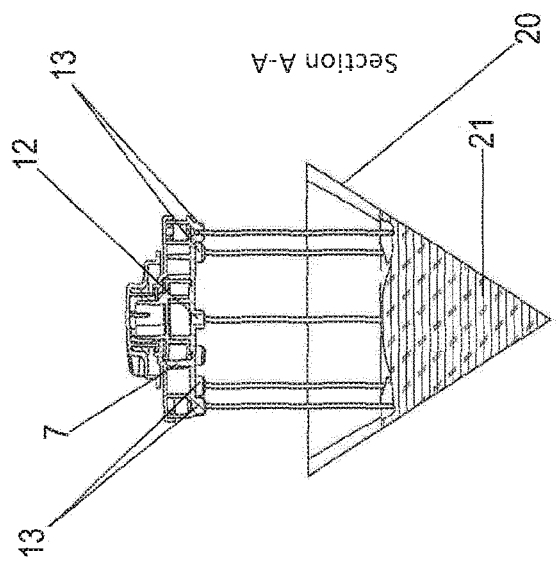
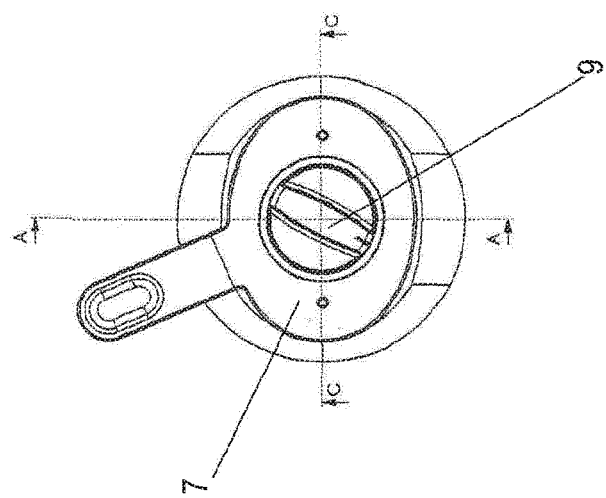

COFFEE MACHINE AND METHOD FOR OPERATING A COFFEE MACHINE

CROSS-REFERENCE TO RELATED APPLICATIONS

This application is a U.S. National Stage Application of International Patent Application No. PCT/EP2016/074319, filed Oct. 11, 2016, which claims benefit of German Patent Application No. 10 2015 121 634.5, filed Dec. 11, 2015.

TECHNICAL FIELD

The present invention relates to a coffee machine, comprising a device for feeding hot water to an outlet device above a filter vessel, into which a filter-paper insert with ground coffee can be inserted, wherein the outlet device has a central outlet opening over a central region of the filled filter-paper insert and a plurality of outer outlet openings which are arranged above a central region of the side walls of the filled filter-paper insert, and the flow rate of hot water is controllable via the individual outlet openings via a selector switch having at least three switching positions for adjusting the coffee strength, and a method for operating such a coffee machine.

BACKGROUND OF THE INVENTION

When brewing coffee, it is known that the strength and the degree of extraction can be represented by a "Coffee Brewing Control Chart". Most consumers prefer a degree of extraction between 18% and 22%. However, there are also consumers who prefer a milder or underdeveloped or stronger or bitterer coffee. U.S. Pat. No. 8,495,950 B2 discloses a method for brewing coffee, in which an optimized calculation of the brewing process takes place. The brewing method is based on the findings from the interaction regarding the degree of extraction (solubles yield) and the coffee strength (solubles concentration).

EP 1 287 772 B1 discloses a device for producing a brewed beverage, in which a water feed device with a plurality of passage openings is provided above a filter vessel. A portion of the passage openings is located on an elliptical peripheral line, which corresponds approximately to the peripheral contour of a projection surface of the filter vessel interior in a lower to middle region of the filter vessel. By supplying the central passage opening or the outer passage openings, the coffee strength can be adjusted when brewing coffee. However, it is difficult to set intermediate positions with this device, and it would be desirable for the user to obtain an operating aid with which the coffee strength can be adjusted in a reproducible manner.

In DE 20 2014 104 028 U1, a beverage machine is disclosed in which an actuator is provided at an inlet, which can assume various switching positions to produce the fluid connection from a liquid inlet to different outlet openings. In a first switching position, only the central outlet opening is supplied with liquid. In a further switching position, the liquid is conducted to second outlet openings, which are arranged on a central circular path around the central outlet opening. In a third switching position, the liquid can then be directed to outlet openings which are arranged on an outer circular path around the central outlet opening. As a result, although the coffee strength can be adjusted by the various switching positions, the structure of the liquid distributor is complex, and there are a variety of outlet openings which must be maintained and cleaned. In addition, there is the disadvantage that in a switching position for strong coffee only the central outlet opening is supplied with liquid, so that in the outer region the ground coffee is only slightly wetted and the coffee beverage has a higher bitterness. Even with a middle switching position, only a limited uniform wetting of the ground coffee is achieved by supplying the liquid via the outlet openings on the central circular path.

SUMMARY OF THE INVENTION

It is therefore an object of the present invention to provide a coffee machine and a method for operating a coffee machine, which can reproducibly adjust a coffee strength by controlling the water supply.

This and other objects are achieved with a coffee machine which, in one embodiment, comprises: a hot water supply device for supplying hot water; an outlet device being adapted for being arranged above a filter vessel a into which a filter paper insert with ground coffee is insertable and for receiving the hot water from the hot water supply device, wherein the outlet device has a central outlet opening over a middle region of the filter-paper insert when filled with ground coffee and a plurality of outer outlet openings arranged above a middle region of the side walls of the filled filter-paper insert; and a controllable selector switch having at least three switching positions for adjusting coffee strength, wherein in all switching positions of the controllable selector switch the hot water is at least partially supplied via the outer outlet openings of the filled filter-paper insert.

Thus, in the coffee machine according to the invention, an outlet device comprises a central outlet opening over a central region of a filled filter-paper insert and a plurality of outer outlet openings, which are preferably arranged on an elliptical or annular circular path which is arranged above a central region of the side walls of the filled filter-paper insert. The flow rate of hot water on the individual outlet openings can be controlled via a selector switch having at least three switching positions for adjusting the coffee strength. In all switching positions of the selector switch, the hot water is supplied at least partially via the outer outlet openings of the filled filter-paper insert. This avoids that when setting the selector switch to medium brew strength or strong brew strength, the boundary region of the filter-paper insert with ground coffee is flowed through only poorly. In addition, the supply of hot water via the outer outlet openings reduces the bitterness of the coffee beverage. In addition to the advantages for the production of the coffee beverage, this structure also leads to the advantage that a smaller number of outlet openings must be provided so that maintenance and cleaning work is reduced.

In a further embodiment, the outlet device has channels for guiding the hot water to the outlet openings and the flow rate to the individual outlet openings can be controlled by the selector switch. Depending on the position of the selector switch, the flow rate of hot water to the outer outlet openings may then be smaller or larger, depending on the position of the selector switch.

If the switch position of the selector switch is set to "strong", preferably the central outlet opening and, to a lesser extent, the outer outlet openings are preferably flowed through, for example in a ratio of 3:1 or 4:1. As a result, the coffee beverage is made with greater strength, since the feed in the middle area ensures a turbulence of the ground coffee and a comparatively long contact time. The supply of water in a boundary region ensures a more uniform wetting and a reduction in the bitterness. In the switching position of the selector switch to "strong", the degree of extraction is preferably above 22% at an average grain size of 350 μm to 450 μm of the ground coffee and a dosage of 60 g of ground coffee per liter. This allows users who like to drink strong and slightly bitter coffee to select the switch position accordingly.

In the case of an intermediate switching position of the selector switch, the degree of extraction is preferably in a range between 18% and 22% at an average grain size of between 350 μm to 450 μm and a dosage of 60 g of ground coffee per liter. This range is preferred by the majority of coffee drinkers because the coffee has sufficient strength and little bitterness.

For an optimum brewing result in the middle switching position, the liquid preferably flows through the ground coffee in a particularly uniform manner. For this purpose, the outlet device comprises at least two further middle outlet openings above a bottom seam or bottom fold of the filter paper, in addition to the central outlet opening, which middle outlet openings are arranged at a smaller distance from the central outlet opening than the outer outlet openings. As a result, the region between the outer outlet openings and the middle outlet opening is also flowed through well, wherein optionally the central outlet opening is blocked when the at least two further middle outlet openings are used. Preferably, in addition to the central outlet opening and the outer outlet openings, the outlet device has only two middle outlet openings, which are provided on opposite sides of the central outlet opening.

By switching the selector switch to "mild", it can be achieved via the outlet device that the extraction rate is below 18% at an average grain size of the ground coffee between 350 μm to 450 μm and a dosage of 60 g of ground coffee per liter, which benefits users who like to drink mild coffee. In this case, in the corresponding switching position of the selector switch only the outer outlet openings are flowed through, so that the contact time with the ground coffee is comparatively short.

In the method according to the invention for operating a coffee machine according to the invention, the liquid supply to the individual outlet openings is controlled by setting the selector switch.

BRIEF DESCRIPTION OF THE DRAWINGS

The invention will be described in more detail below with reference to an embodiment shown in the accompanying drawings, wherein:

FIG. 1 shows a perspective view of a coffee machine according to the invention;

FIG. 2 shows an exploded perspective view of the coffee machine of FIG. 1;

FIGS. 3A to 3D show several views of an outlet device of the coffee machine of FIG. 1;

FIGS. 4A to 4F show several views of the outlet device of the coffee machine in the setting "strong";

FIGS. 5A to 5F show several views of the outlet device of the coffee machine in the setting "medium";

FIGS. 6A to 6F show several views of the outlet device of the coffee machine in the setting "mild"

DETAILED DESCRIPTION

Figure 3D:
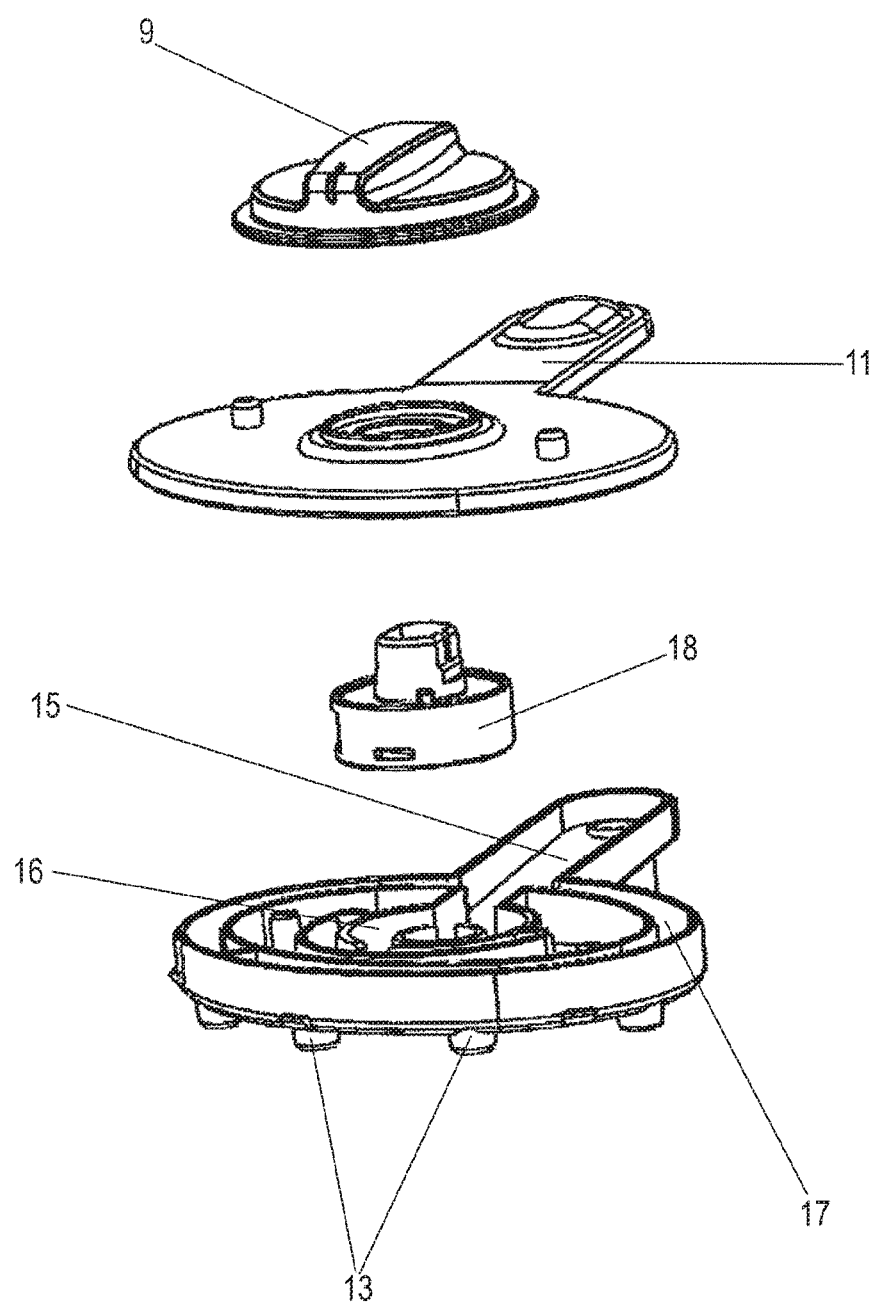
Figure 6C:
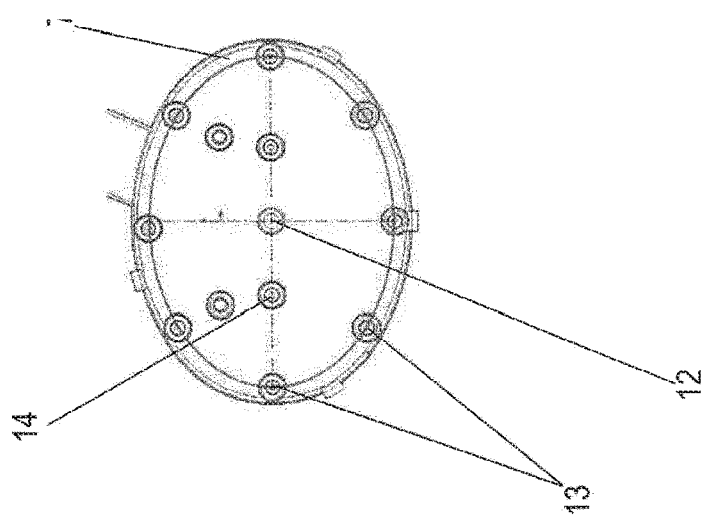
Figure 6B:
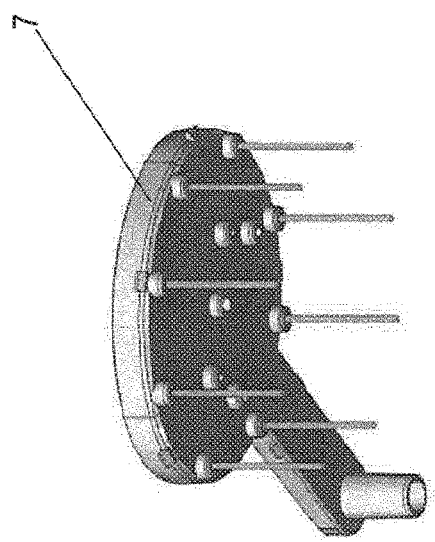
Figure 6A:
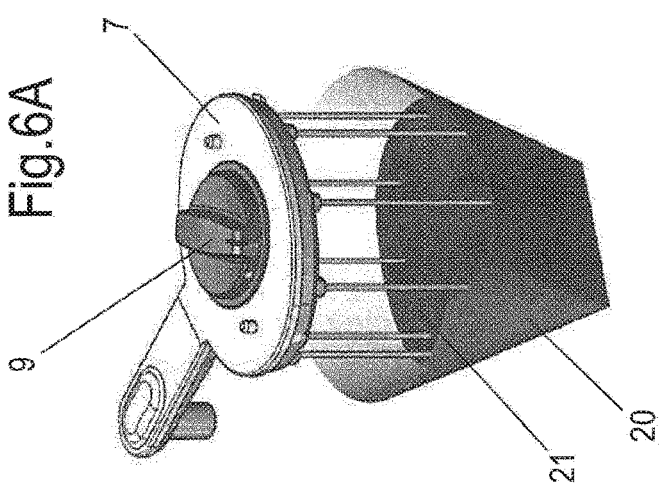

A coffee machine 1 comprises a housing 2, on or in which a tank for fresh water and a heating device are provided. On the housing 2, a filter vessel 4 is provided, in which a frusto-conical filter-paper insert is insertable. Below the filter vessel 4, a pot 5 is provided for freshly brewed coffee, which is placed on a hot plate 6.

At the top of the housing 2 is a removable cover 3, on which an opening 8 is provided for a selector switch 9. By turning the selector switch 9, the coffee strength of the brewed coffee can be adjusted.

According to the view of FIG. 2, an outlet device 7 for hot water is provided below the lid 3, which can be controlled via the selector switch 9.

In FIGS. 3A to 3D, the outlet device 7 is shown in detail. The outlet device 7 comprises an extension arm 11, on which a tubular inlet 10 for hot water is provided. The hot water flows from the inlet 10 via a channel 15 within the extension arm 11 to channels 16 and 17, and then to flow into the filter vessel 4 via outlet openings 12, 13 and 14. In this case, there is a central outlet opening 12 over a middle region of filled filter-paper insert which is a disposed underneath, while outer outlet openings 13, which are arranged on a circular or elliptical orbit around the central outlet opening 12, are arranged above a lower or middle region of the side walls of the filled filter-paper insert. With regard to the arrangement of these outer outlet openings 13, reference is made to EP 1 287 772 B1, wherein departing therefrom also a circular arrangement of the outer outlet openings can be provided. On the underside of the outlet device 7 there are also two middle outlet openings 14, which together with the central outlet opening 12, lie on one line. In each case, there is a middle outlet opening 14 on opposite sides of the central outlet opening 12. The middle outlet openings 14 are positioned above a bottom seam or bottom fold of a filter-paper insert arranged underneath.

The supply of hot water to the outlet openings 12, 13 or 14 can be controlled via the selector switch 9. For this purpose, an outer channel 17 is disposed in the outlet device, which allows the supply to the outer outlet openings 13. In addition to the outer channel 17, a middle channel 16 is provided, which controls the supply to the central outlet opening 12 and the middle outlet openings 14. The amount of water supplied can be adjusted via the selector switch 9, which acts on a switching element 18, which is equipped with corresponding wall and closure elements to control the supply of water to the channels 16 and 17.

In FIGS. 4A to 4F, the selector switch 9 is in the brewing position "strong". In this switching position, hot water flows via the outlet device 7, and with priority, the hot water is introduced via the central outlet opening 12 into a filter-paper insert 20 in which ground coffee 21 is filled. Another part of the hot water flows over the outer outlet openings 13, so that the ground coffee is also wetted on the outside and excessive bitterness of the coffee beverage is avoided. As a result of the introduction of the hot water into the ground coffee 21 essentially in the middle, it is vortexed in the middle area and a comparatively strong coffee is brewed. The extraction result is above 22%.

FIGS. 5A to 5F show a middle setting of the selector switch 9. By changing the selector switch 9, the hot water still flows through the outer openings 13, but instead of the central outlet opening 12 only via the two middle outlet openings 14. This change causes the ground coffee to be wetted even more evenly and the turbulence in the middle central region of the ground coffee is slightly lower. In the schematic views of FIGS. 5E and 5F, the ground coffee 21 is shown with a substantially straight upper plane, while in FIGS. 4E and 4F a central recess is shown through the central water jet.

In FIGS. 6A to 6F, the setting of the selector switch 9 has been set to "mild". In this setting of the selector switch 9, the hot water flows exclusively through the outer openings 13 into the filter vessel 4 with the filter-paper insert 20, so that the ground coffee 21 is wetted substantially in the outer region, in which the filling height of the ground coffee through the oblique side walls is less in the vertical direction than in the middle region. This brews a milder coffee, and the degree of extraction is less than the other settings of the selector switch 9, in particular less than 18%.

The outlet device 7 described above was subjected to tests using different grades of ground coffee for the tests. In the test with the coffee marketed under the trade name "MELITTA AUSLESE", first the grain size distribution and the average grain size were determined, since these have an influence on the degree of extraction. The determined grain size distribution is given by the following table:

| Grain class (μm) | Grain size distribution (%) | | | |
| --- | --- | --- | --- | --- |
| | "MELITTA AUSLESE" | "JACOBS KRÖNUNG" | "TCHIBO FEINE MILDE" | "DALLMAYR PRODOMO" |
| <63 | 7.0 | 9.6 | 7.9 | 5.2 |
| 63-125 | 8.6 | 8.0 | 8.5 | 7.6 |
| 125-250 | 9.7 | 8.8 | 9.4 | 10.7 |
| 250-400 | 18.6 | 16.8 | 24.9 | 25.5 |
| 400-500 | 19.0 | 18.3 | 28.7 | 19.7 |
| 500-1000 | 36.1 | 38.0 | 20.6 | 31.3 |
| >1000 | 1.0 | 0.5 | 0.0 | 0.0 |
| Average grain size (μm) | 433 | 437 | 396 | 405 |

The majority of the ground coffee has a grain size of between 125 and 500 μm, although this also applies to products from other manufacturers. This results in an average grain size of about 433 μm. This ground coffee was used for the tests to determine the degree of extraction. The ground coffee was filled with a dosage of 60 g/l into a filter-paper insert 20, and then the degree of extraction was measured depending on the switching position of the selector switch 9.

Figure 7:
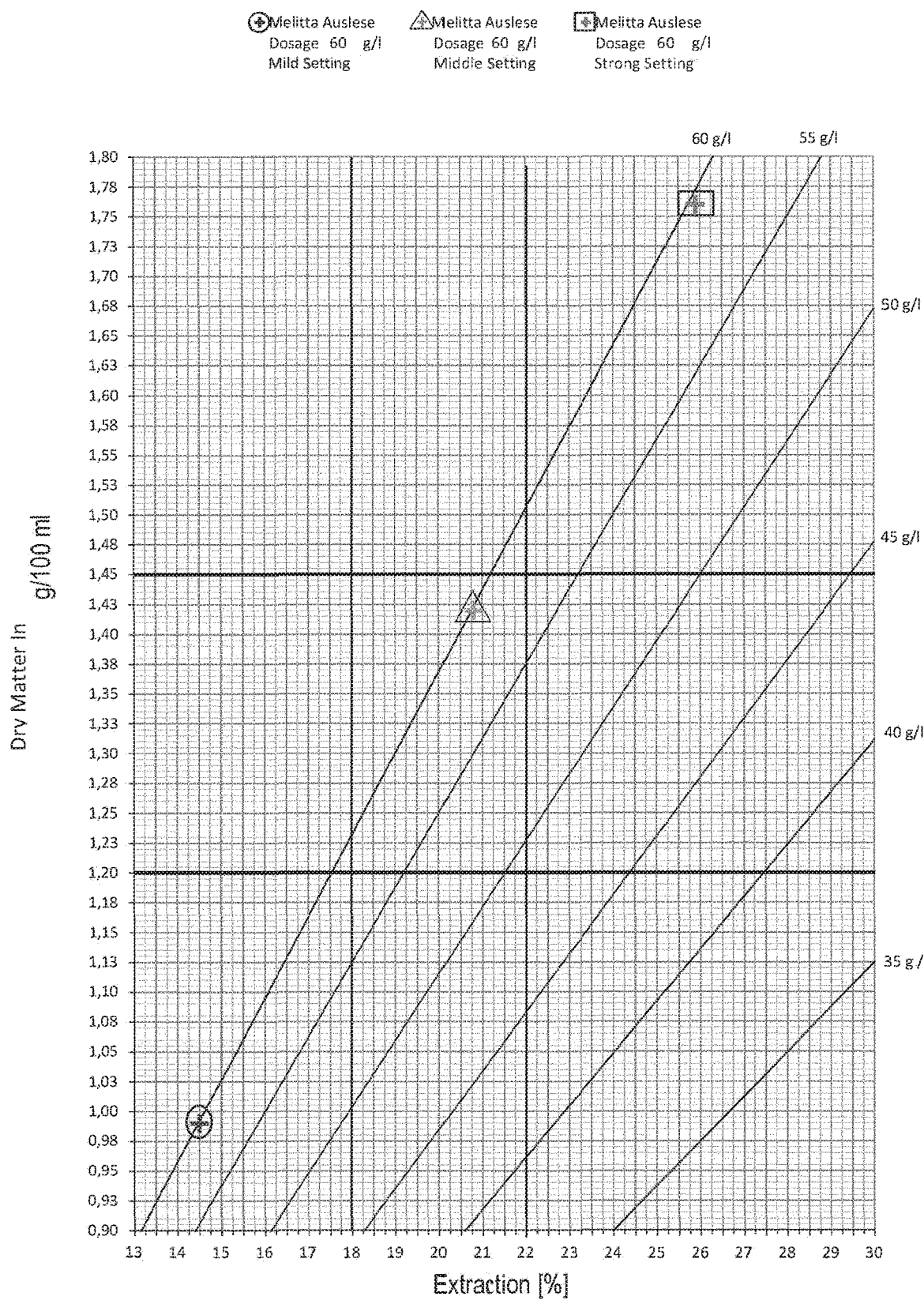
FIG. 7 is a graphical view of the coffee strength depending on the setting of the selector switch of the coffee machine.

As shown in FIG. 7, the setting of the selector switch 9 can influence the extraction result. Most coffee drinkers prefer an extraction level between 18 to 22%, which is achieved by setting the selector switch to the middle position. When set to the position "strong", the degree of extraction is over 22% and can develop a certain bitterness, which is desirable however. If, on the other hand, a milder coffee should be brewed, then the extraction rate is below 18%. By setting the selector switch 9, a reproducible degree of extraction can thus be obtained.

The invention claimed is:

1. A coffee machine, comprising:
a hot water supply device for supplying hot water;
an outlet device being adapted for being arranged above a filter vessel into which a filter paper insert with ground coffee is insertable and for receiving the hot water from the hot water supply device, wherein the outlet device has a central outlet opening over a middle region of the filter-paper insert when filled with ground coffee, a plurality of radially outermost outlet openings arranged above a middle region of the side walls of the filled filter-paper insert, and at least two middle outlet openings above a bottom seam or bottom fold of the filter paper insert and radially between the central outlet opening and the outermost openings; and
a controllable selector switch to control a rate of hot water through the outlet openings of the outlet device, the controllable selector switch having at least three switching positions for adjusting coffee strength, wherein in all switching positions of the controllable selector switch the hot water is at least partially supplied via the outermost outlet openings over the filled filter-paper insert.

2. The coffee machine according to claim 1, wherein the outlet device comprises channels to guide the hot water to the outlet openings and the flow rate to the individual outlet openings is controllable by the controllable selector switch.

3. The coffee machine according to claim 1, wherein the controllable selector switch has a "strong" switching position in which liquid is caused to flow through both the central outlet opening and the outermost outlet openings.

4. The coffee machine according to claim 3, wherein in the strong switching position of the controllable selector switch, the degree of extraction is over 22% at an average grain size between 350 μm to 450 μm and a dosage of 60 g of ground coffee per liter.

5. The coffee machine according to claim 1, wherein the controllable selector switch has a middle switching position in which a degree of extraction is in a range of between 18% to 22% at an average grain size of the ground coffee between 350 μm to 450 μm and a dosage of 60 g of ground coffee per liter.

6. The coffee machine according to claim 5, wherein in the middle switching position of the controllable selector switch, liquid is caused to flow through the at least two middle outlet openings for a uniform wetting of the ground coffee.

7. The coffee machine according to claim 1, wherein the outlet device has only two middle outlet openings located on opposite sides of the central outlet opening.

8. The coffee machine according to claim 1, wherein the controllable selector switch has a "mild" switching position in which a degree of extraction lies below 18% at an average grain size of the ground coffee between 350 μm to 450 μm and a dosage of 60 g per liter.

9. The coffee machine according to claim 8, wherein in the "mild" switching position of the controllable selector switch, liquid is caused to flow only through the outermost outlet openings.

10. A method for operating a coffee machine according to claim 1, including controlling a degree of extraction of the ground coffee by adjusting the position of the controllable selector switch.

* * * * *